(12) United States Patent  
Walter et al.

(10) Patent No.: US 7,990,005 B2
(45) Date of Patent: Aug. 2, 2011

(54) POWER TRANSMISSION TOOL AND SYSTEM

(75) Inventors: Richard T. Walter, Baldwin, MD (US); Michael L. O'Banion, Westminster, MD (US)

(73) Assignee: Atlas Dynamic Devices, LLC, Westminster, MD (US)

( * ) Notice: Subject to any disclaimer, the term of this patent is extended or adjusted under 35 U.S.C. 154(b) by 456 days.

(21) Appl. No.: 12/069,118

(22) Filed: Feb. 7, 2008

(65) Prior Publication Data

US 2009/0200878 A1 Aug. 13, 2009

(51) Int. Cl.
*H02K 9/00* (2006.01)
*H02K 5/00* (2006.01)
*H02K 1/27* (2006.01)

(52) U.S. Cl. ............... 310/89; 310/88; 310/52; 310/58; 318/400.12; 451/359

(58) Field of Classification Search ............ 310/50, 310/52, 88, 57–59, 64; 318/400.12; 451/359; 173/18; 388/937, 800; *H02K 5/00, 9/00*
See application file for complete search history.

(56) References Cited

U.S. PATENT DOCUMENTS

| | | | |
|---|---|---|---|
| 2,155,082 A * | 4/1939 | Decker | 173/217 |
| 2,862,120 A | 11/1958 | Onsrud | |
| 3,244,030 A | 4/1966 | Godfrey | |
| 4,381,037 A | 4/1983 | Cuneo | |
| 5,821,674 A * | 10/1998 | Weiner | 310/68 D |
| 6,093,128 A | 7/2000 | Seith | |
| 6,104,112 A | 8/2000 | Vanjani | |
| 6,300,693 B1 | 10/2001 | Poag | |
| 6,359,390 B1 * | 3/2002 | Nagai | 315/169.1 |
| 6,538,403 B2 | 3/2003 | Gorti | |
| 6,700,237 B1 | 3/2004 | Yang | |
| 7,007,762 B2 | 3/2006 | Yamamoto | |
| 7,053,567 B2 | 5/2006 | Yamamoto | |
| 7,109,613 B2 | 9/2006 | Lui | |

(Continued)

FOREIGN PATENT DOCUMENTS

EP 3710048 * 3/1987

(Continued)

OTHER PUBLICATIONS

Machine Translation of DE3710048, Sine, Jun. 16, 1988, Rohrgehause fur einen Elektromotor.*

(Continued)

*Primary Examiner* — Quyen Leung
*Assistant Examiner* — Terrance Kenerly
(74) *Attorney, Agent, or Firm* — Wood, Herron & Evans, LLP

(57) ABSTRACT

An improved power tool system includes a power tool and an external power supply connected via a cable to provide utility and safety in a hazardous operation such as loading ammunition into a weapon in an environment of flammable materials and extreme environmental exposure. The power tool includes a sparkless motor, a sparkless controller and sparkless switches, in a sealed enclosure with improved heat transfer means. The power tool has improved torque controlling means to mitigate reaction torque to the operator and equipment when starting or stopping highly inertial loads. A sealed enclosure is provided to prevent liquids from entering the motor and controller cavity and includes a thermally conductive path to conduct heat from the motor and controller through the enclosure to cooling fins and a coolant path formed between the fins and an entrapment wall.

12 Claims, 5 Drawing Sheets

U.S. PATENT DOCUMENTS

| | | | |
|---|---|---|---|
| 7,143,816 B1 | 12/2006 | Ghosh | |
| 7,157,819 B2 | 1/2007 | Matsumoto | |
| 2004/0000393 A1* | 1/2004 | Tavassoli | 165/80.3 |
| 2004/0017120 A1* | 1/2004 | Lyle et al. | 310/71 |
| 2005/0103510 A1* | 5/2005 | Gass et al. | 173/217 |
| 2006/0119197 A1* | 6/2006 | Puterbaugh et al. | 310/87 |
| 2006/0163956 A1* | 7/2006 | Sahashi et al. | 310/68 C |
| 2009/0096300 A1* | 4/2009 | Oyoung et al. | 310/54 |

FOREIGN PATENT DOCUMENTS

| | | | |
|---|---|---|---|
| JP | 09065596 | * | 3/1997 |
| JP | 11299174 | * | 10/1999 |

OTHER PUBLICATIONS

Machine translation of JP0965596, Ishimoto et al., Mar. 7, 1997, Motor with inverter.*

* cited by examiner

POWER TRANSMISSION TOOL AND SYSTEM

BACKGROUND OF THE INVENTION

This invention relates to a power tool which may be used in and around environments which may be exposed to flammable substances while providing a configuration which is conducive for the operator to handle while transmitting high torque to the application.

Historically, power tools have been made to be lightweight yet provide a high level of power yielding a high power density. This was achieved by utilizing a type of motor called a universal motor.

A universal motor requires carbon brushes to transmit and commutate electricity to the rotating armature. The universal motor typically employs an air moving fan to move air through the motor housing to exhaust the heat from the motor. These motors typically operate at mains voltage supplies from roughly 10V AC to 240V AC.

Typically, power tools of this type use a snap acting contactor line switch to make and break the supply of the electric power supply.

This construction will allow any potentially explosive gasses to become ignited as the cooling fan causes them to flow through the tool and come in contact with either the electric arc at the brushes or the switch.

One such system is described in U.S. Pat. No. 2,155,082, the Decker patent where he describes a motor with brushes, a fan to produce airflow, air openings in the field case through which the air passes, a switch and gearcase.

Another type of power tool well known in the trade is the type powered by a battery. The motor typically utilized to power these tools is a permanent magnet motor. The permanent magnet motor operates from voltages of typically between 8V DC to 36V DC. The electric current is conducted from the battery through carbon brushes to the rotating armature. This so called "Cordless Power Tool" also employs a switch with contacts which cause an arc when the switch is operated. This type of tool offers the user the freedom of operation without a cord. However the tools are limited in their ability to transmit large amount of power for an extended period of time due to the finite amount of energy in the battery.

A typical universal motor and a typical permanent magnet motor produces a speed torque characteristic such that the torque is at a maximum when the speed is at zero rpm. This characteristic causes the motor and load to accelerate very quickly to full rpm. Typically this acceleration occurs in approximately 0.05 seconds.

Power tools may employ a brushless DC motor. This type of motor typically may produce a combination of speed and torque which produce a high power density similar to that of the previously mentioned motors. These motors do not employ carbon brushes and a rotating commutator to function thereby. Therefore, they do not produce any arc during operation. Yamamoto U.S. Pat. No. 7,053,567 discloses a brushless DC motor for use in a power tool. However this type of motor is controlled with a computer and an electronic switching circuit which characteristically produces a signature of electromagnetic interference (EMI).

Applications exist which demand a high torque and speed over an extended period of time. Some applications, for example aboard a Naval Aircraft Carrier, have such a requirement. These applications often require a large amount of power to complete the necessary work. The amount of power required is significantly greater than is practical to be stored in a portable battery attached to a tool.

These applications have the need to move a substantial mass in addition to the requirement for high torque and speed. Starting and stopping such a mass with a power driver such as a compressed air powered ratchet wrench, causes an adverse reaction to the operator. This reaction may result in a large force reaction which the operator must counteract.

Some such applications for high power requirements are subject to exposure to potentially dangerous fluids and gasses such as on an aircraft carrier or in an aircraft hanger. Additionally, these applications may be exposed to salt spray and rain. Additionally, the ambient temperature on board an aircraft carrier, for example may be very extreme ranging from a negative 40 degrees Celsius to a positive 60 degrees Celsius.

Many applications such as those mentioned have the additional requirement to be very mobile. Lui U.S. Pat. No. 7,109,613 discloses a power tool which is protected from liquids. The invention describes an enclosure which protects the motor from liquids with a thermally conductive part that is exposed to the exterior outside the body for the purpose of conducting heat from the motor for heat dissipation. Lui however is limited to dissipating heat to the outside through one end of the motor enclosure which is necessarily limited in surface area and consequentially may not conduct a large amount of heat at an ambient temperature of 60 degrees Celsius.

Vanjani U.S. Pat. No. 6,104,112 teaches of a sealed brushless DC motor with an integral controller. However Vanjani discloses the need for a heat sink, however, the invention provides a heat flow path for only the electronic controller and not the motor.

The Onsrud U.S. Pat. No. 2,862,120 discloses an efficient means of transferring heat from a sealed motor compartment to the exterior with a pair of eccentric shells separated by a series of variously dimensioned axially extending radial baffle ribs. The Onsrud patent however does not disclose the means for moving the cooling fluid past the cooling ribs.

Several applications, such as tasks to be performed on the deck of an aircraft carrier, require power to be transmitted quickly in environments which may become exposed to jet fuel or explosives from ammunition. These applications do not utilize mains power or compressed air due to the difficulty and hazard of dragging hoses or cable across the busy flight deck. Also it is not practical to use a gasoline powered compressor or generator as gasoline is not permitted on the flight deck due to the hazardous nature of gasoline. Diesel powered generators or compressors while permitted on a flight deck, are not practical due to the extreme weight which renders them not portable enough to rapidly deploy from application to application. Consequently, for many of these applications a manual hand powered crank tool, or speed wrench much like one manufactured by "Snap on Tools" Speeder, 18⅞" Stock #S4 is employed. The use of this type of hand tool is extremely fatiguing for the operator and consequently the application is not completed as quickly as desired.

One such application is loading 20 mm artillery rounds into the magazine of a Gattling gun mounted in a jet fighter as one step in preparing the fighter to be redeployed. These rounds are entrained in a long chain which is stored in an ammunition storage car. The chain of ammunition stored is typically a quantity of 5000 to 6000 rounds. In addition to the rounds mass is the mass of the carrier chain which contributes to a substantial inertia. The ammunition is then transferred to the magazine inside the gun on the aircraft. A mechanism internal to the gun is a cranking mechanism which moves the chain of rounds into the gun and thereby fills the guns magazine with 500 to 550 rounds. This cranking mechanism requires approximately 20 to 25 foot pounds of torque to operate. The mechanism in the gun has a maximum torque capability which must not be exceeded or failure of the mechanism may result.

The operator must stand on a small elevated platform to allow him to be accessible to the gun cranking mechanism. The precarious position of the operator requires a smooth transfer of torque so as to not cause him to lose his balance and fall. A power tool such as described in the Godfrey U.S. Pat. No. 3,244,030 would provide a measure of control for management of the torque due to the positioning of the handle on an "L" shaped drill housing.

An additional application is to elevate the hinged wing sections of jet aircraft to allow more compact storage aboard aircraft carriers. Internal to the stationary portion of the aircraft wing is a crank mechanism which when rotated lifts the wing portion to the folded position. This typically requires a torque of between 20 to 25 foot pounds and requires approximately 300 revolutions to fully lift the wing. The wing elevation mechanism has a maximum torque capability which must not be exceeded or failure of the mechanism may result.

The application of cranking the wing up to the folded position and down to the deployed position requires both clockwise and counterclockwise rotation of the mechanism. A motorized means of raising and lowering the wing should have a means to assure the rotational direction of the motor does not change during operation. Cuneo U.S. Pat. No. 4,381,037 describes a means to prevent inadvertent motor reversal.

These two applications are now performed with a speed wrench. These operations require a team of up to five workers due to the intensity and fatigue of the operation.

SUMMARY OF THE INVENTION

It is, accordingly, an object of the invention to provide a power tool and system which can deliver a combination of speed and torque for an extended period of time, to start and stop a large inertia without adverse reaction to the user, and to operate in a potentially hazardous environment like an aircraft hangar or aircraft carrier flight deck.

According to the invention a brushless DC motor will be employed with an electronic motor controller to control the characteristics of the motor output speed and torque. It is an object of this invention to provide a gradual speed ramp up and ramp down to minimize the inertial reaction forces transmitted to the operator and thereby prevent an adverse reaction for the operator to counteract while standing on a potentially small elevated platform.

An additional object of the invention is to provide an intrinsically safe power tool motor, and controller which does not create an arc during its operation.

An additional object of the invention is to construct the power tool with an electrical switching system which does not create an arc while allowing the operator to effectively control the power supply to the motor controller and additionally to control the forward and reversing direction of the motor.

Another object of the invention is to provide an electric switching and motor reversing switch which is interlocked so as to preclude inadvertent motor reversal while in operation.

Another object of the invention is to provide a configuration of power tool which allows the operator to easily control the reaction forces due to a relatively large torque transmission.

Another objective of the invention is to provide a power tool which is salt spray and rain resistant.

Another objective of the invention is to provide a power tool which does not transmit significant EMI Another object of the invention is to provide a power tool which has an efficient means of transferring heat from the internally sealed motor and controller space to the exterior environment.

Another object of the invention is to provide a power tool which transmits a relatively large amount of torque and power compared with typical commercially available power tools with additional means to prevent excess torque from causing damage to the application.

Another object of the invention is to provide a method of loading ammunition into a gun or canon with which the reaction forces are easily controlled and less fatiguing for the user and accomplishes the task in a shorter period of time than current methods. The method disclosed is intrinsically safe to be used near possible exposure to liquid fuels. The method disclosed also is protected from degradation when exposed to water spray and salt fog environments.

Another object of the invention is to provide a method of raising and lowering the moveable portion of jet aircraft wings with which the reaction forces are easily controlled and less fatiguing for the user and accomplishes the task in a short period of time than current methods. The method disclosed is intrinsically safe to be used near possible exposure to liquid fuels. The method disclosed also is protected from degradation when exposed to water spray and salt fog environments.

Other objects, features and advantages of the present invention will be readily understood after reading the following detailed description together with the accompanying drawings.

DETAILED DESCRIPTION OF THE PREFERRED EMBODIMENT OF THE INVENTION

Figure 1:
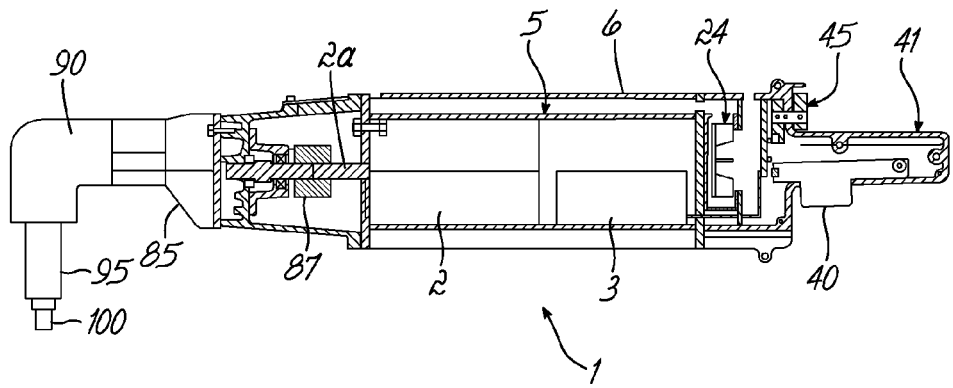
FIG. 1 is a side longitudinal cross section view of the disclosed tool

As described below, a power transmission tool and system, designed for intrinsically safe operation, may include a brushless or sparkless motor, speed reducing means, a power controller, an arcless or sparkless power switch and motor direction switch, a right angle power transmission means, a torque limiting clutch, a power transmission coupling means, and heat transfer means are housed in a "L" shaped housing which has a human interface ergonomic handle to manage the forces due to torque transmission, and with a detachable power cable and an exterior power supply box.

The motor and controller are encased in a sealed housing which has external cooling fins and end plates which are sealably attached to the first end and second end of the motor housing. The speed reducing means may be a train of gears of the parallel axis or planetary design. The housing of the gears may be sealed to prevent water or dust ingress.

The lower speed shaft from the speed reducing means is attached to the right angle power transmission means. The means to transmit power at a right angle may be by use of any number of gearing types well known in the art including bevel, hypoid, spiral bevel, worm gear or the like.

A torque limiting clutch is attached to the output shaft of the right angle power transmission means. The output of the clutch is coupled to a power transmission drive coupling means. This means may be a ½" male square drive to adapt to the ½" square female socket for some of the possible applications mentioned above.

The motor and controller housing with external fins provide a heat transfer path to expel heat from the motor and controller. The motor may be fastened to the end plate of the enclosure. The motor is typically made from steel laminations. The housing with external fins and the end plates are preferably made from a light metal like aluminum or magnesium. The environmental temperature range requirements of the application cause a differential thermal expansion of the steel motor and preferred aluminum housings. This differential thermal expansion requires a space between the exterior of the motor and the interior of the housing.

Ideally heat is transferred most efficiently through direct contact without an air gap. An air gap reduces heat transfer substantially. Thus, to efficiently transfer the heat from the exterior of the motor through the space required for thermal expansion it is necessary to displace the air with a substance which has a higher heat transfer coefficient for example commonly known is one of many thermally conductive silicone grease which may have a thermal conductivity of approximately 0.002 Cal/sec. Cm ° C. A thermally conductive resin such as DeltaCast 153 from Wakefield Engineering is an alternative conductive filler.

The exterior of the motor housing has fins to increase the surface area which commonly known enhances the heat transfer through convection to the air. The disclosed design has a relatively large exterior surface area of approximately between 8 to 12 inches long by a perimeter of 40 to 60 inches providing a surface area of approximately 320 square inches to 720 square inches.

Typically, the application aboard an aircraft carrier has air movement due to the movement of the ship. This air movement will remove heat from the exterior fins.

The invention provides alternatively, for applications which may have minimal air movement, for a forced air movement across the external fins and an air entrainment wall which forces the air to move across the full length of the exterior fins. The air is forced across the fins by means of a blower which may be one of many known types typically either an axial fan or centrifugal fan may be employed.

The blower must be exposed to the exterior air to move air over the exterior of the fins. This blower must also be intrinsically safe which means it must make no electrical sparks or arcs in its normal operation. Typically the motor used for this application is a brushless DC motor with integral electronic controls.

The motor power must be controlled by an operator to energize and de-energize the motor. Additionally the direction of rotation of the motor must be selectable by the operator to allow selective direction change. The invention discloses a means to prevent movement of the reversing switch mechanism when the energizing switch is engaged.

The switching system must not create sparks or arcs during operation. The invention uses a magnetic reed switch which is mounted to a PC Board which in turn is mounted in the housing. The energizing lever or trigger has a magnet attached which when moved proximate to the reed switch will cause the reed switch to make electrical contact and thereby energize the controller and motor. Similarly, a reed switch will be mounted to a PC board adjacent to the reversing lever. The reversing lever will have a magnet attached, which when placed proximate to the reversing reed switch will cause the controller to reverse motor direction.

FIG. 1 shows a power tool 1 including a motor 2, a controller 3, and a motor enclosure or housing 5 which totally encloses the motor and controller. The motor 2 has an output shaft 2a which is rotationally coupled to a coupling 87. At the distal end of the power tool 1 is the speed reducing means 85 which is rotationally coupled to the coupling 87 and its output is rotationally coupled to the right angle power transmission means 90. The output of the right angle power transmission means 90 is coupled to a torsional torque limiting clutch 95 which is torsionally coupled to an output drive means 100, preferably a ½" square drive. Attached to the motor housing 5 at the proximal end is a handle housing 41 which encases a motor-energizing trigger 40 and motor-rotation-reversing lever 45. The handle 41 is displaced from the drive means 100 by a substantial distance, preferably more than 10 inches and as much as 40 inches, thus providing a large moment arm which minimizes the reaction force which the operator must control.

Figure 2:
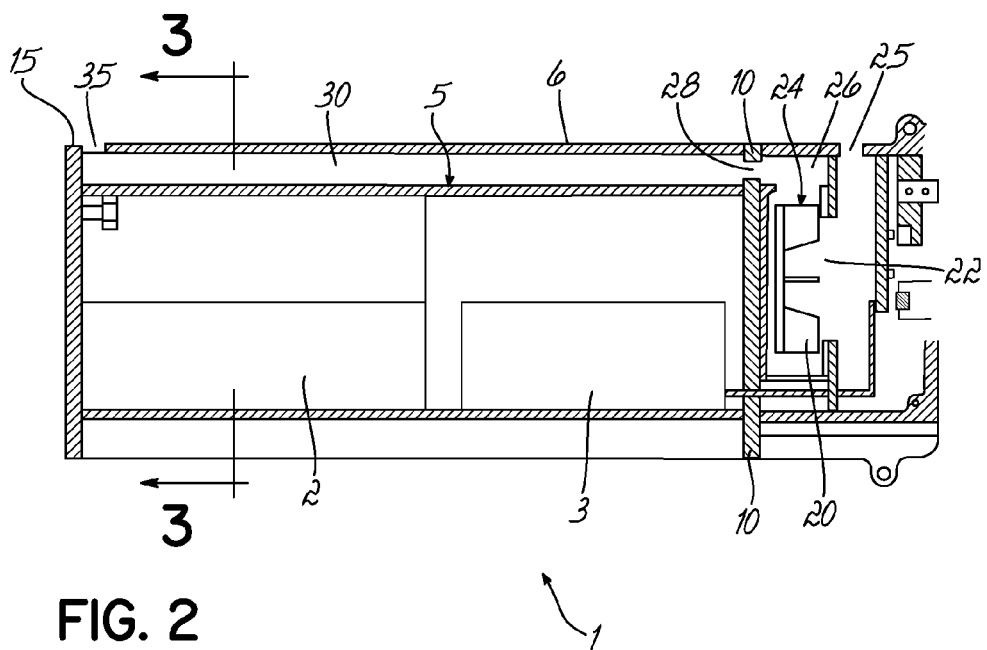
FIG. 2 is a longitudinal cross section view showing the center section of the sealed motor and controller compartment

FIG. 2 shows an enlarged section view of the motor and controller housing 5, first end plate 10 and a second end plate 15 which together enclose the ends of the motor housing and seal it against ingress of water and dust by use of gaskets between the interface surfaces.

The motor is cooled by means of air flowing through the air intake ports 25 then into the blower 24 and the blower intake port 22. The blower blades 20 rotate centrifugally to cause a differential pressure thereby urging the air to flow to a blower exhaust chamber 26 of the blower 24. The air then is forced through ports 28 in the first end plate 10 into the channels 30 shown in FIG. 3 formed between cooling fins 5b. The present invention includes air entrainment walls 6 which force the air fully through the length of the channels 30 created by the fins 5b to finally exiting from the power tool 1 to the atmosphere through ports 35.

Figure 3:
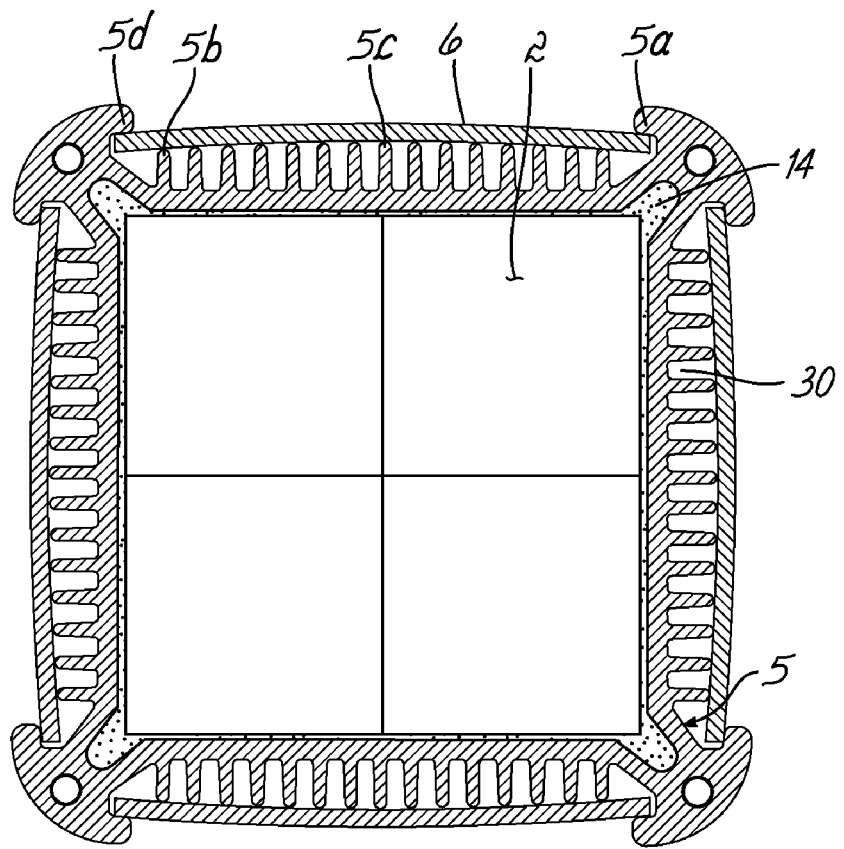
FIG. 3 is a cross sectional view of the motor controller compartment

FIG. 3 shows a cross section of the motor 2 and motor housing 5 with the air entrainment walls 6. The air entrainment walls 6 are retained by portions of the motor housing 5 shown as 5a and 5d. The motor housing 5 has longitudinal fins 5c and 5b representing many fins over its entire length. Fin Sc is shown to be longer than fin 5b. The walls 6 are manufactured as flat planar pieces. When the walls 6 are inserted in the space under the portion of the motor housing 5a and 5d, the walls must be compliantly bent over the larger fin 5c. This elastic bending of the walls 6 places a residual force on the walls so as to prevent vibration.

The motor 2 is mounted inside the motor housing 5 leaving enough space for thermal contraction when exposed to at least as low as negative 40° C. The space may be filled with a thermally conductive material 14 such as grease or resin to enhance heat transfer.

Figure 4:
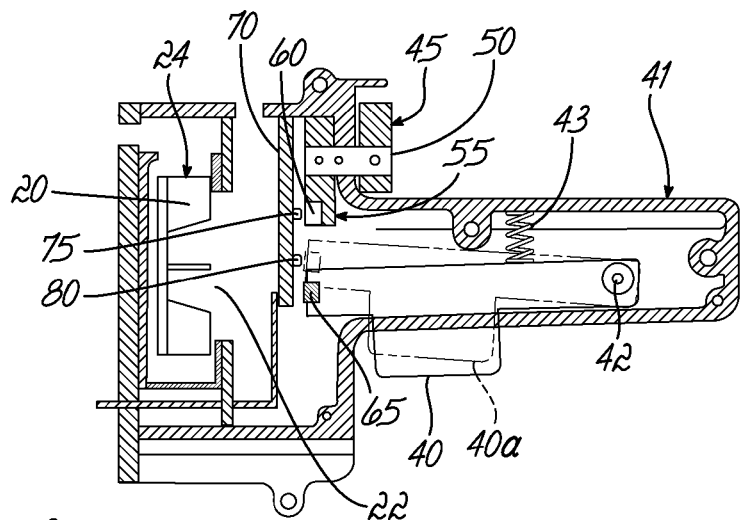
FIG. 4 is a longitudinal section view of the housing which encloses the cooling means and switching means.

FIG. 4 shows the handle housing 41 which encases a trigger 40 shown in the de-energized position, and the trigger shown in the energized position 40a. The trigger may be pivotally mounted and rotate around a pivot pin 42 and have a bias spring 43 which will return the trigger to the de-energized off position. Trigger 40 has mounted in it a magnet 65. When the trigger 40 is in the energized position 40a the magnet is positioned at a distance from a reed switch 80, the reed switch when open, causes the controller 3 to send power to the motor 2. When the trigger 40 is in the de-energized position the magnet is proximate to the reed switch causing the reed switch to be in a closed position thus interrupting the power supply to the motor 2 and controller 3.

Figure 5:
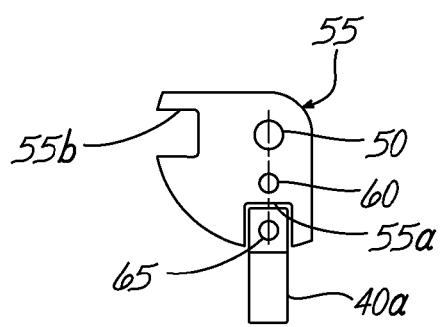
FIG. 5 is a rear end view showing the interlocking switch quadrant in position 1
Figure 6:
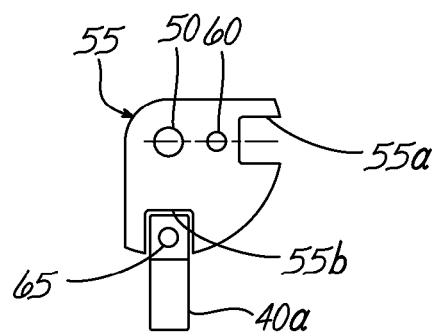
FIG. 6 is a rear end view showing the interlocking switch quadrant in position 2

A reversing lever 45 is rotationally moveable about an axis of a shaft 50, as further shown in FIG. 5 and FIG. 6, by the user to cause a reversal of direction of the motor 2. The lever 45 is fastened to a shaft 50 by use of screws or keys or the like. A reversing quadrant 55 is also fastened to shaft 50. The reversing quadrant has a magnet 60 attached. When magnet 60 is positioned proximal to a "Fwd/rev" reed switch 75 the controller circuitry is changed to cause the motor 2 to rotate in a preferred direction.

When the magnet 60 is moved distally from the reed switch 75 the controller circuitry is changed to cause the motor 2 to operate in an opposite to the preferred direction.

FIG. 5 shows the reversing quadrant 55 in the preferred position with magnet 60 proximal to the reed switch 75. When in this position, the quadrant 55 has a slot 55a. Slot 55a allows space to allow the trigger 40a to enter. When trigger 40a is engaged with slot 55a the quadrant 55 is prevented from rotation about shaft 50.

FIG. 6 shows quadrant 55 rotated approximately 90 degrees counterclockwise from the position shown in FIG. 5. In this position the magnet 60 is in a distal location from the reed switch. In this position slot 55b is adjacent the trigger 40a allowing trigger to engage into slot 55b thereby prevent further rotation of the reversing quadrant 55 while trigger 40 in position 40a causes the motor to be energized.

Figure 7:
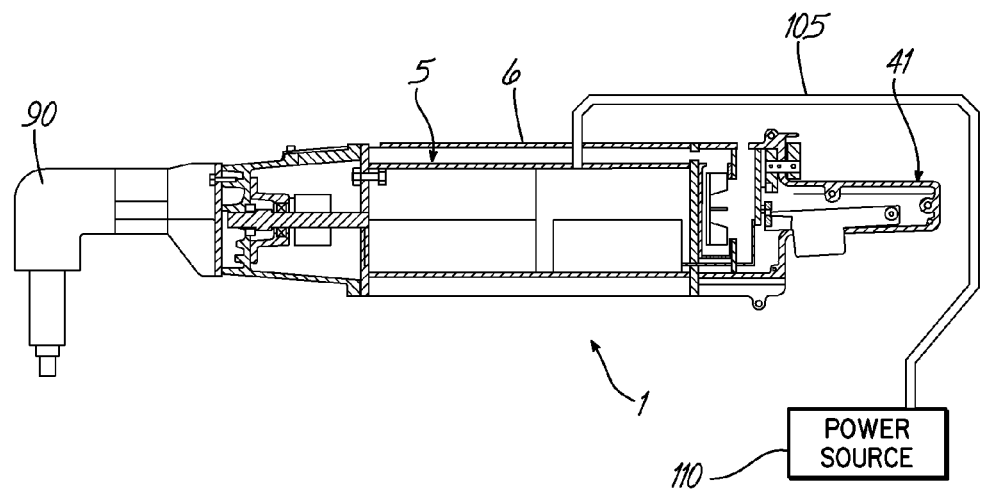
FIG. 7 is a longitudinal section view of the disclosed tool, a power supply cable and an energy source

FIG. 7 shows power tool 1 and power supply cable 105 removably connected to a power supply 110. The power supply is preferably a series of rechargeable batteries. The batteries may be of any voltage but preferably a high voltage is desired to reduce electrical losses due to requiring a lower electrical current.

Figure 8:
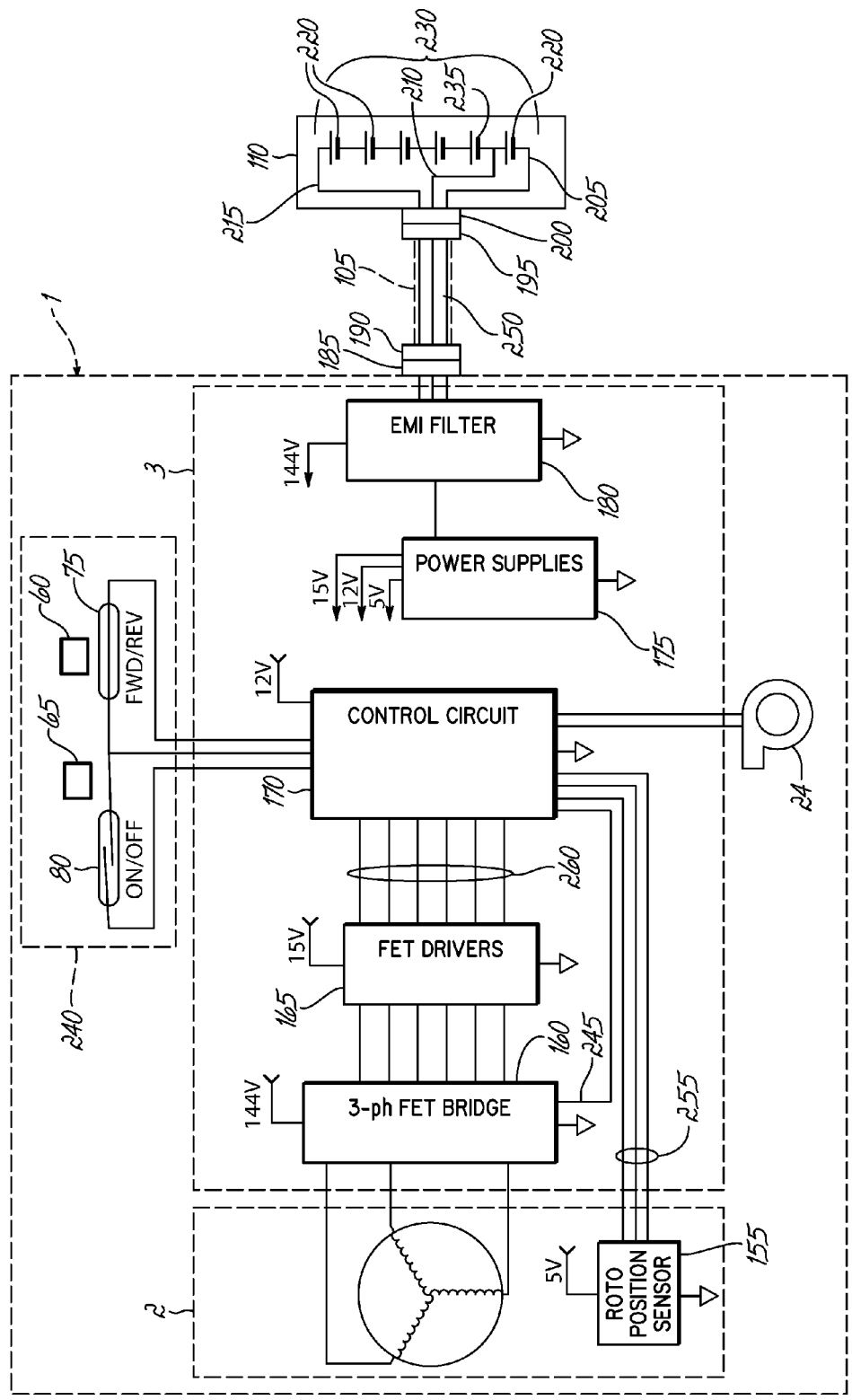
FIG. 8 is a block diagram describing the electrical functions of the invention

FIG. 8 shows power tool 1, including the motor 2, the controller 3, the blower 24, and switching means 240, connected by means of a cable 105 to a power source 110.

The motor 2 is a brushless DC motor consisting of a rotor (not shown), a poly-phase stator 150, and a rotor position sensor 155. In this preferred embodiment, the stator 150 has a typical three phase winding and the rotor position sensor 155 consists of three Hall sensors spaced at 120 electrical degrees. Other configurations would work as well and are to be considered within the scope of this invention.

The controller 3 consists of an electronic circuit residing in a housing made of a thermally conductive material preferably aluminum which serves as a heat sink and thermally conductive path to the motor housing 5.

The components of the controller 3 include a FET Bridge section 160, a FET driver section 165, a main Control Circuit section 170, a power supply section 175, and an EMI filter section 180.

The FET Bridge section 160, in this preferred embodiment, consists of six FETs connected in a typical three-phase bridge circuit. While this embodiment uses FETS, other embodiment could use IGBTs without affecting the intent of the invention. The FET Bridge section 160 also contains a current sensor and a feedback path 245 to the main Control Circuit 170.

The FET Driver section 165 consists of circuitry that converts the six logical state signals from the main controller section 170 to gate drive signals for each of the six FETs in the FET Bridge section 160.

The heart of the controller 3 is the main Control Circuit section 170. This section reads and interprets the states of inputs and responds with appropriate outputs. The inputs to the main Control Circuit 170 are: the state of the "On/Off" reed switch 80, the state of the "Fwd/Rev" reed switch 75, the amplitude of the motor current as interpreted from current feedback path 245, and the rotor position and speed as interpreted from rotor position inputs 255 from the rotor position sensor 155.

The outputs of the main Control Circuit 170 are the six logical state signals 260 to the FET Driver section 165 and the voltage output to the blower 24. Depending on the state of reed switch 75, the commutation pattern of the six logical state signals 260 will drive the motor in either the clockwise or counterclockwise direction. In addition to the commutation pattern, the six logical state signals 260 are pulse width modulated to control the speed of the motor 2.

The main Control Circuit 170 contains a closed loop speed control function which interprets the speed signal from the rotor position sensor 155, compares this signal to a factory set reference, and adjusts the pulse width of the PWM pulses of the six logical state signals. In this way, the speed of motor 2 is held constant throughout the normal load range.

Blower 24 is preferably of the centrifugal blower type consisting blower blades 20, air intake port 22, air exhaust chamber 26, an integral brushless DC motor, and an integral brushless DC motor controller. Blower 24 is located outside of the clean air environment defined by the volume enclosed by motor enclosure 5, first end plate 10, and second end plate 15.

Therefore, to protect blower 24 from salt spray and rain, the integral control and the windings of the integral blower motor are sealed with a protective coating. One such coating is typically is known as potting with a polymeric resin. Another well known coating is a conformal coating. Blower 24 is energized only when the trigger 40 is depressed.

The operator of tool 1 controls the function of the device by means of the trigger 40 and the reversing lever 45 as previously described above with respect to FIGS. 4, 5, and 6. The electrical details of this user interface is shown in FIG. 8.

The switching means 240 consists of two reed switches, 75 and 80 and two magnets 60 and 65. The "On/off" reed switch 80 is actuated by magnet 65 mounted on the trigger 40. The "Fwd/rev" reed switch 75 is actuated by magnet 75 mounted on the reversing quadrant 55.

The reed switches 75 and 80 are connected to a Main Control Circuit 170 by means of three conductors. The common conductor is connected to ground potential.

When a magnet is made to approach a reed switch as shown in the case of the "Fwd/rev" reed switch 75, the switch will go to the closed state and the Main Control Circuit 170 sees a logical "0" input. When a magnet is distal to a reed switch as shown in the case of the "On/off" reed switch 80, the switch will go to the open state and the Main Control Circuit will see a logical 1 input.

When the Main Control Circuit 170 receives a logical "1" at the "On/off" reed switch 80, the control energizes the blower 24 and starts the motor 2 slowly. The motor speed ramps up from zero rpm to full speed in about 0.5 seconds so as to limit the torque reaction transmitted to the operator and the equipment to which the tool is connected. The rotational direction during this ramp up and running of motor 2 is dependent on the logical state of the "Fwd/rev" reed switch 75.

In this embodiment, the power source 110 is an electrochemical battery 230 consisting of a plurality of serially connected sub-batteries 220. Battery 230 is tapped such that three electrical output wires are available. These wires are battery positive 215, battery negative 205, and a low voltage tap 210 that is connected at the serial junction of the most negative sub-battery and the next sub-battery 235 connected to it, thereby providing a dual voltage power source.

In this preferred embodiment, the battery 230 consists of five sub-batteries 220 and one sub battery 235, each sub-battery thereof consisting of 20 Nickel-Cadmium rechargeable cells or any of many well known types of rechargeable cell chemistry. Since the nominal voltage of a charged Nickel-Cadmium cell is 1.2 volts, the nominal voltage of each sub-battery is 24 volts and the nominal voltage of the complete battery is 144 volts.

Therefore, referring to the three electrical output wires connected to the battery, in this preferred embodiment, the voltage at wire 215 is nominally 144 volts, the voltage at wire 210 is nominally 24 volts, and wire 205 is still battery negative or zero volts.

For protection against physical abuse and the elements, battery 230 will be housed in one or more nested metal housings.

The three electrical output wires of the power source 110 are made available by means of electrical connector 200. Connector 200 consists of a plurality of electrical connection means preferably in the form of female sockets enveloped in a metallic shell that provides EMI (Electro-Magnetic Interference) shielding and means for electrically grounding the tool to the battery housing.

Other power supplies may be used within the scope of this invention such as a lower voltage battery supply commonly available on vehicles, including military vehicles such as 12 or 24 volts DC. This power supply may be modified into a higher voltage lower current source to supply power tool 1 with the preferred 144 volts by means of an inverter which is well known in the art.

Other power supplies which fall within the scope of this invention are electric generators producing either DC or AC wave forms In the case of an AC wave form producing generator the power may be rectified to produce DC power which may be utilized by the power tool 1

Also, mains power supply of any voltage may be used to energize power tool 1 by use of one of many power converters which convert and condition the wave form into the desired voltage and current needed.

Cable assembly 105 consists of connector 190, connector 195 and a length of multi-conductor cable 250 connecting the two. Connector 190 consists of a plurality of electrical connection means preferably in the form of female sockets enveloped in a metallic shell.

Connector 195 consists of a plurality of electrical connection means preferably in the form of male pins enveloped in a metallic shell. Connector 195 mates with connector 200 on the battery housing and connector 190 mates with connector 185 on the tool 1.

Connectors 185, 190, 195, and 200 are exemplified in the preferred embodiment by MIL-DTL-38999 series III connectors.

The multi-conductor cable 250 has a sufficient number of conductors to convey the three electrical output wires from the battery, plus a ground wire and, possibly, an outer shield to reduce EMI emissions from the cable as well as to protect the cable from abrasion.

At connector 185, the tool 1 is supplied with the three electrical output wires from the battery. Thus the tool 1 has two separate power inputs. One of these is a high voltage, high power input exemplified in the preferred embodiment as 144 volts. The other is a low voltage, low power input exemplified by 24 volts.

The three wires are fed through an EMI filtering section 180. The EMI filtering section consists of arrays of capacitors and inductors that are well known to those versed in the art.

After passing through the EMI filtering section 180, the high voltage, high power input is fed to the three phase FET bridge 160. The low voltage, low power input is fed to the internal power supply section.

The power supply section provides regulated low voltage supplies to the various other sections of the control 3. In the preferred embodiment, the power supply section feeds 12 volts DC to the main Control Circuit section 170, 15 volts DC to the FET Driver section 165, and 5 volts DC to the rotor position sensor 155 located in the motor 2. The power supply section produces the regulated voltages by means of three terminal linear voltage regulators as exemplified by the μA78L00 series of positive voltage regulators from Texas Instruments.

What is claimed is:

1. A power tool, comprising:
   a motor;
   a controller;
   a motor and controller housing, said motor and said controller disposed within said motor and controller housing;
   a first end plate;
   a second end plate;
   said first end plate and said second end plate sealingly coupled with respective ends of said motor and controller housing to prevent the intrusion of liquids and gasses;
   a switch selectively controlling energy to said controller;
   the exterior of said motor and controller housing having at least one fin for conducting heat from an interior of said housing to the exterior of said motor and controller housing;
   power transmission structure operatively coupled with said motor;
   a handle operatively coupled with said motor and controller housing; and
   an outer casing comprising at least one wall enclosing and contacting said at least one fin and cooperating with said at least one fin to define at least one air passage between said motor and controller housing and said at least one wall;
   wherein said motor and controller housing has multiple fins for conducting heat, said fins are of varying length, and said wall is held in contact with said fins by portions of said motor and controller housing, thereby creating conduits through which a cooling fluid is conducted thereby improving the removal of heat from said motor and controller housing.

2. A power tool, comprising:
   a motor;
   a controller;
   a motor and controller housing, said motor and said controller disposed within said motor and controller housing;
   a first end plate;
   a second end plate;
   said first end plate and said second end plate sealingly coupled with respective ends of said motor and controller housing to prevent the intrusion of liquids and gasses;
   a switch selectively controlling energy to said controller;
   the exterior of said motor and controller housing having at least one fin for conducting heat from an interior of said housing to the exterior of said motor and controller housing;

power transmission structure operatively coupled with said motor;

a handle operatively coupled with said motor and controller housing; and an outer casing comprising at least one wall enclosing and contacting said at least one fin and cooperating with said at least one fin to define at least one air passage between said motor and controller housing and said at least one wall;

wherein said motor and controller housing comprises at least one recess for receiving an outer peripheral edge of said at least one wall to thereby retain said at least one wall on said motor and controller housing.

3. The power tool system of claim 2, wherein said motor is a brushless motor.

4. The power tool system of claim 2, wherein said power cable is electromagnetically shielded.

5. The power tool system of claim 2, wherein said switch comprises at least one sparkless switch.

6. The power tool of claim 2, wherein said switch is at least one sparkless switch and said motor is a brushless motor.

7. The power tool of claim 6, wherein a thermally conductive media is disposed between said motor and controller housing and the motor exterior.

8. The power tool of claim 6, wherein said motor and said controller are supplied power from an exterior power supply through a power cable.

9. The power tool of claim 8, wherein said power cable is dual voltage cable.

10. The power tool of claim 2, wherein said switch comprises at least one magnetic reed switch activated by at least one magnet.

11. The power tool of claim 2, wherein said at least one wall is removably coupled to said motor and controller housing for contact with said at least one fin.

12. The power tool of claim 2, wherein said at least one wall is elastically deformed to engage said at least one fin.

* * * * *

UNITED STATES PATENT AND TRADEMARK OFFICE
CERTIFICATE OF CORRECTION

PATENT NO.       : 7,990,005 B2
APPLICATION NO.  : 12/069118
DATED            : August 2, 2011
INVENTOR(S)      : Richard T. Walter et al.

It is certified that error appears in the above-identified patent and that said Letters Patent is hereby corrected as shown below:

<u>Column 1</u>
Lines 24-25, reads, "explosive gasses" and should read -- explosive gases --.
Line 42, reads, "ability to transmit large amount of" and should read -- ability to transmit a large amount of --.
Lines 44-45, reads "universal motor...magnet motor produces" and should read -- universal motor and...magnet motor produce --.
Line 49, reads, "0.05 seconds" and should read -- 0.05 second --.
Lines 51-52, reads, "a combination of...which produce" and should read -- a combination of...which produces --.

<u>Column 2</u>
Line 7, reads, "fluids and gasses" and should read -- fluids and gases --.
Line 26, reads, "teaches of a sealed brushless" and should read -- teaches a sealed brushless --.

<u>Column 3</u>
Last Line, reads, "transmit significant EMI" and should read -- transmit significant EMI. -- .

<u>Column 4</u>
Line 21, reads, "in a short period of time than" and should read -- in a shorter period of time than --.

<u>Column 5</u>
Lines 31-32, reads, "one of many...grease which may" and should read -- one of many...greases which may --.

<u>Column 6</u>
Line 47, reads, "Fin Sc" and should read -- Fin 5c --.

<u>Column 7</u>
Line 27, reads, "thereby prevent" and should read -- thereby preventing --.

Signed and Sealed this
Twenty-second Day of November, 2011

David J. Kappos
*Director of the United States Patent and Trademark Office*

CERTIFICATE OF CORRECTION (continued)
U.S. Pat. No. 7,990,005 B2

Lines 56-57, reads, "other embodiment could use" and should read -- other embodiments could use --.
Line 22, reads, "consisting blower blades" and should read -- consisting of blower blades --.

Column 8
Lines 30-31, reads, "coating is typically is known as" and should read -- coating is typically known as --.
Line 37, reads, "details of...is shown in" and should read -- details of...are shown in --.

Column 9
Line 36, reads, "wave forms In the case of" and should read -- wave forms. In the case of --.
Line 39, reads, "by the power tool 1" and should read -- by the power tool 1. --.

Column 10
Line 29, Claim 1, reads, "liquids and gasses" and should read -- liquids and gases --.
Line 61, Claim 2, reads, "liquids and gasses" and should read -- liquids and gases --.